US006118243A

United States Patent [19]

Reed et al.

[11] Patent Number: 6,118,243

[45] Date of Patent: Sep. 12, 2000

[54] DOOR OPERATOR SYSTEM

[75] Inventors: Brett A. Reed, Alliance; Gregory E. Williams, Minerva, both of Ohio; Robert C. Kass, Dallas, Tex.; Dennis W. Waggamon, Massillon, Ohio

[73] Assignee: Overhead Door Corporation, Dallas, Tex.

[21] Appl. No.: 09/287,505

[22] Filed: Apr. 7, 1999

[51] Int. Cl.[7] .................... H02P 7/00

[52] U.S. Cl. .................... 318/468; 49/28; 318/282

[58] Field of Search .................... 318/280–286, 318/466–469, 461, 463; 49/28, 31, 194, 199

[56] References Cited

U.S. PATENT DOCUMENTS

| | | | |
|---|---|---|---|
| 3,858,452 | 1/1975 | Gatland et al. . | |
| 4,241,540 | 12/1980 | Depperman . | |
| 4,247,806 | 1/1981 | Mercier . | |
| 4,335,339 | 6/1982 | Brickner . | |
| 4,338,553 | 7/1982 | Scott, Jr. . | |
| 4,369,399 | 1/1983 | Lee et al. . | |
| 4,394,607 | 7/1983 | Lemirande . | |
| 4,628,636 | 12/1986 | Folger | 49/199 |
| 4,638,433 | 1/1987 | Schindler . | |
| 4,706,727 | 11/1987 | Leivenzon et al. | 160/188 |
| 4,819,376 | 4/1989 | Taddei | 49/200 |
| 4,855,653 | 8/1989 | Lemirande . | |
| 4,980,618 | 12/1990 | Milnes et al. . | |
| 5,151,638 | 9/1992 | Beckerman . | |
| 5,214,359 | 5/1993 | Herndon et al. . | |
| 5,218,282 | 6/1993 | Duhame . | |
| 5,285,136 | 2/1994 | Duhame | 318/266 |
| 5,334,876 | 8/1994 | Washeleski et al. | 307/10.1 |
| 5,473,497 | 12/1995 | Beatty . | |
| 5,543,692 | 8/1996 | Howie et al. | 318/282 |
| 5,557,887 | 9/1996 | Fellows et al. | 49/28 |
| 5,684,372 | 11/1997 | Fitzgibbon et al. | 318/280 |
| 5,701,063 | 12/1997 | Cook et al. . | |
| 5,770,934 | 6/1998 | Theile | 318/469 |
| 5,841,253 | 11/1998 | Fitzgibbon et al. . | |
| 5,925,996 | 7/1999 | Murray et al. | 318/471 |
| 5,929,580 | 7/1999 | Mullet et al. | 318/466 |
| 5,950,364 | 9/1999 | Hormann | 49/26 |

*Primary Examiner*—Bentsu Ro
*Assistant Examiner*—Rina Duda
*Attorney, Agent, or Firm*—Akin, Gump, Strauss, Hauer & Feld, LLP

[57] ABSTRACT

A door operator system for an upward acting sectional or one piece (California-type) garage door includes a DC variable speed motor directly connected to a drive mechanism for moving the door between open and closed positions. A motor control circuit includes circuit components for reversing the direction of rotation of the motor and for delivering a pulse width modulated voltage signal to the motor to control motor speed. A current sensor including a split core transformer and a Hall effect sensor detects motor current and provides a signal to a microcontroller for stopping the motor or stopping and reversing the motor if the motor current reaches a preset limit which is user settable by potentiometers connected to the microcontroller. Magnetic position limit switches and an obstruction detector are operably connected to the microcontroller to provide input signals indicating the state of the door and the control circuit. A motor shaft mounted encoder provides a pulse-type signal to the microcontroller to provide a speed signal and a door position signal. The microcontroller is operable to control operation of the motor to move the door toward an open position at a speed at least twice the speed of movement of the door to a closed position. The encoder and microcontroller detect maximum door travel in the door opening mode and reduce motor speed in subsequent operating cycles if the operator is connected to a one piece door.

31 Claims, 9 Drawing Sheets

| Fig. 3A |
|---|
| Fig. 3A(1) |
| Fig. 3B |
| Fig. 3B(1) |

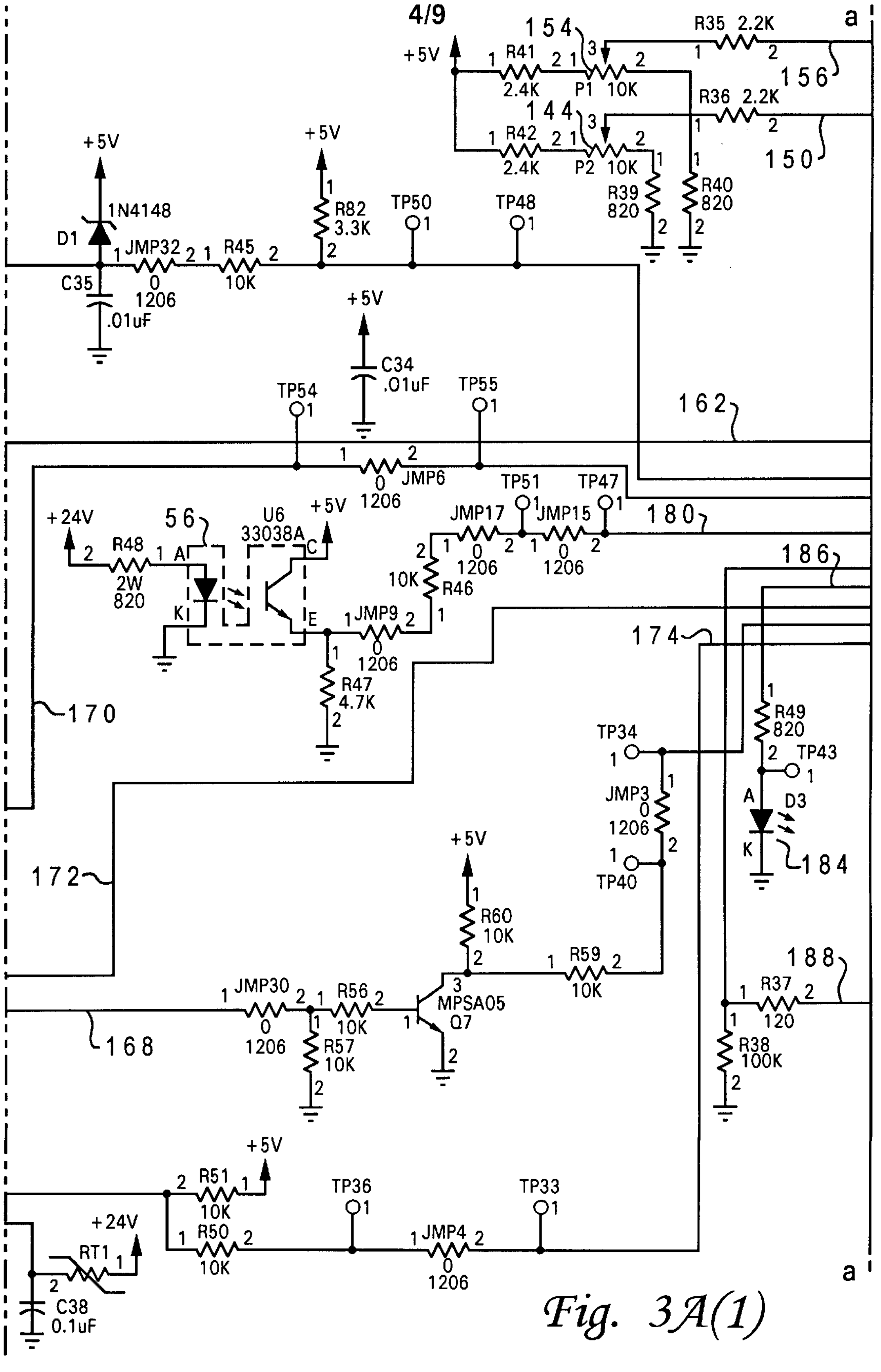
*Fig. 3A(1)*

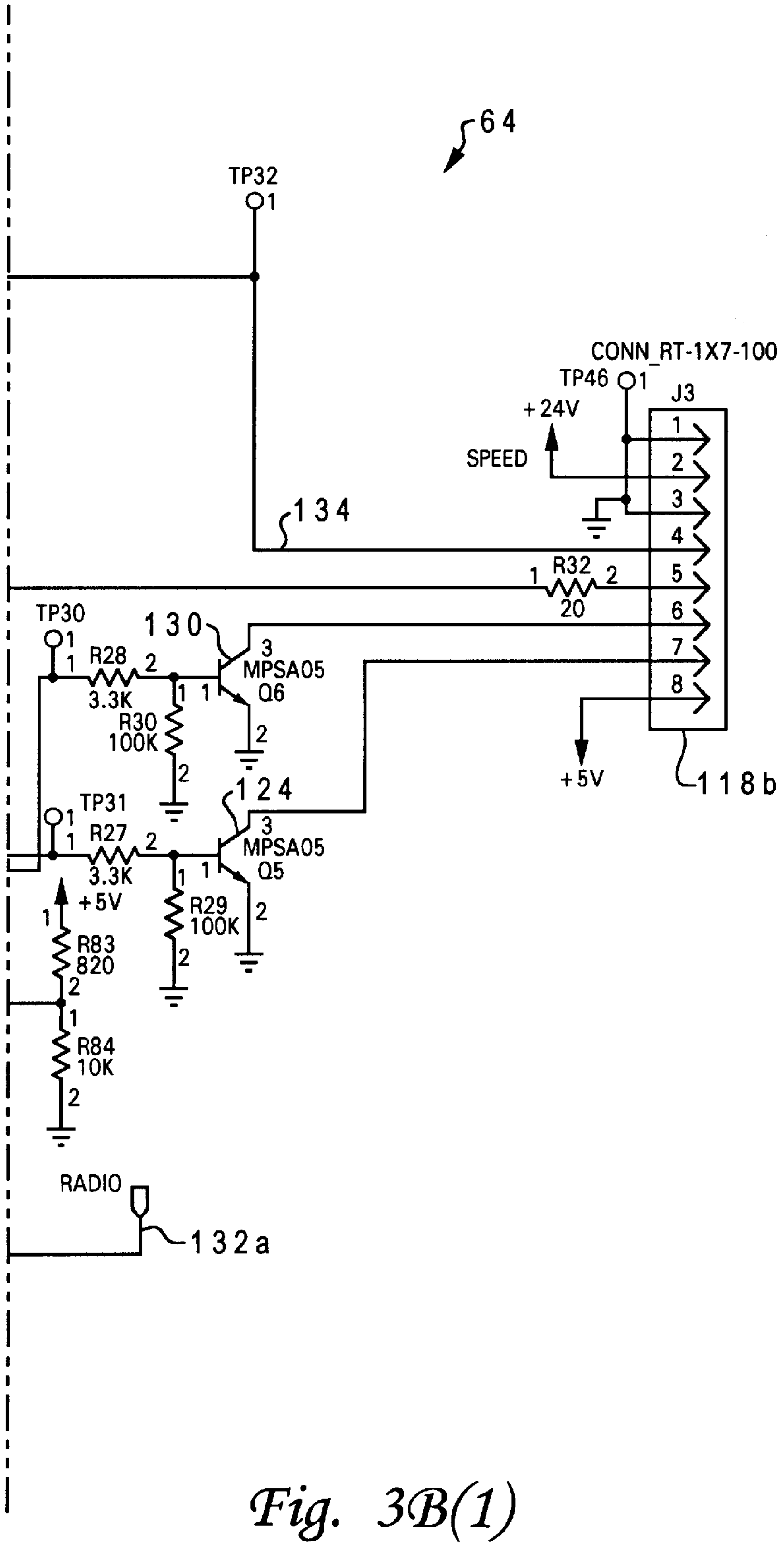
*Fig. 3B(1)*

DOOR OPERATOR SYSTEM

FIELD OF THE INVENTION

The present invention pertains to a door operator system including a motor driven door operator and a controller therefor, particularly adapted for opening and closing upward acting garage doors and the like.

BACKGROUND

Substantial developments have been carried out in the art of operators and control systems associated therewith for remotely controlling the opening and closing of upward acting sectional or one piece garage doors.

There has been a continuing need to provide garage door operators and control systems therefor which minimize the hazards associated with opening and closing the door, and provide for opening the door rapidly so that the user may make a rapid entry or exit with respect to the garage, or other structure, while providing reduced stress on the operator and the door. There has also been a need to achieve operation automatically by remote control with substantial reliability. These needs have posed certain problems in the provision of door operators and control systems associated therewith.

Still other problems associated with garage door operator systems include the desire to provide an operator and control system associated therewith which can be easily and accurately adjusted by the user to automatically stop or reverse the direction of movement of the door in the event of encountering an obstruction, detect whether or not the operator is controlling a sectional type door or a one piece or so-called California type door and provide for variable speed control of the door opening and closing cycle to provide for rapid opening of the door at a controlled rate of speed with acceleration and deceleration phases and acceptable reduced closing speeds of the door, again with acceleration and deceleration phases of the closing cycle. All of these features are desired to be incorporated in a door operator and control system associated therewith which requires minimal effort to install and establish operation thereof.

It is to all of these ends that the present invention has been developed.

SUMMARY OF THE INVENTION

The present invention provides an improved door operator and control system for remote controlled opening and closing of a door, particularly a sectional or one piece upward acting garage door.

In accordance with one aspect of the present invention, a door operator is provided which is characterized by a reversible DC electric drive motor that is driven directly from rectified AC line voltage and is directly coupled to a door actuating drive mechanism. The DC motor is supplied with a pulse width modulated voltage power signal to achieve variable speed and power requirements. Motor speed is determined through the use of an encoder, preferably including an optical signal interrupt wheel mounted directly on the motor output shaft. A pulse type signal generated by the encoder is used to determine changes in motor speed, total travel of the operator and door for purposes of detecting the type of door to which the operator is connected and to provide for speed control in the door opening and closing modes.

In accordance with another aspect of the present invention, a door operator and control system therefor is provided which is operable to determine whether or not the operator is connected to a sectional type upward acting door or a one piece or so-called California-type door and to adjust the operating speed in accordance with the type of door being acted on.

Still further, the present invention provides a control system for a door operator which automatically controls movement of the door from a closed position to an open position at a speed greater than movement from an open position to a closed position. Moreover, the present invention also provides a control system for an upward acting door operator which is operable to sense current flow to the operator motor and to utilize limit signals proportional to current flow as obstruction detection signals to effect stopping and/or reversing the direction of movement of the door in response to selectively settable current limits.

The present invention yet further provides an improved method for operating an upward acting door to move between open and closed positions.

Those skilled in the art will further appreciate the above-mentioned advantages and superior features of the invention, together with other important aspects thereof upon reading the detailed description which follows in conjunction with the drawings.

DETAILED DESCRIPTION OF A PREFERRED EMBODIMENT

Figure 1:
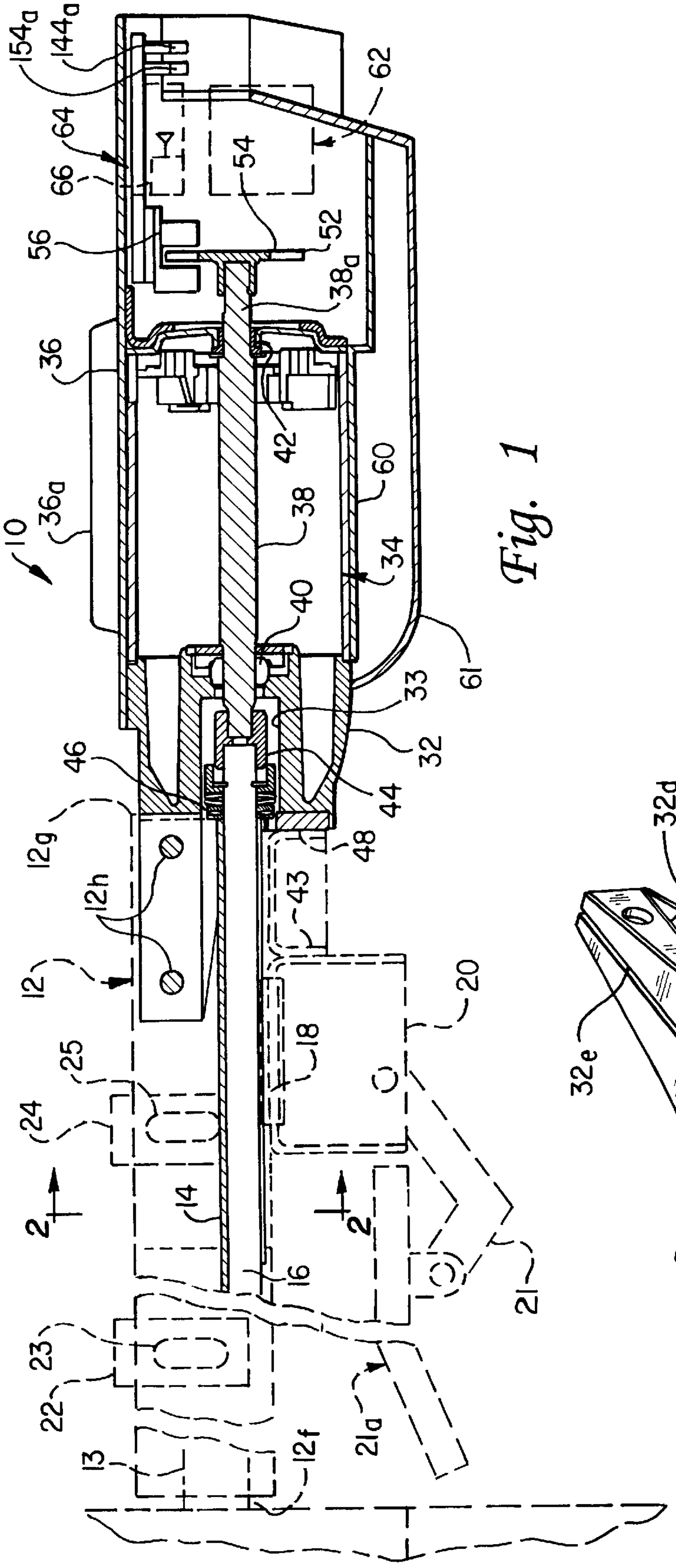
FIG. 1 is a longitudinal central section view, in somewhat schematic form, of a door operator in accordance with the present invention.

In the description which follows like parts are marked throughout the specification and drawing with the same reference numerals, respectively. The drawing figures are not necessarily to scale and certain elements are shown in somewhat generalized or schematic form in the interest of clarity and conciseness.

Figure 1B:
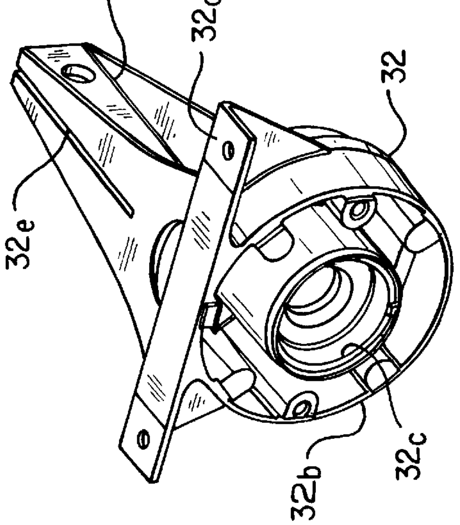
FIG. 1B is a perspective view of a motor support member for the operator.
Figure 1A:
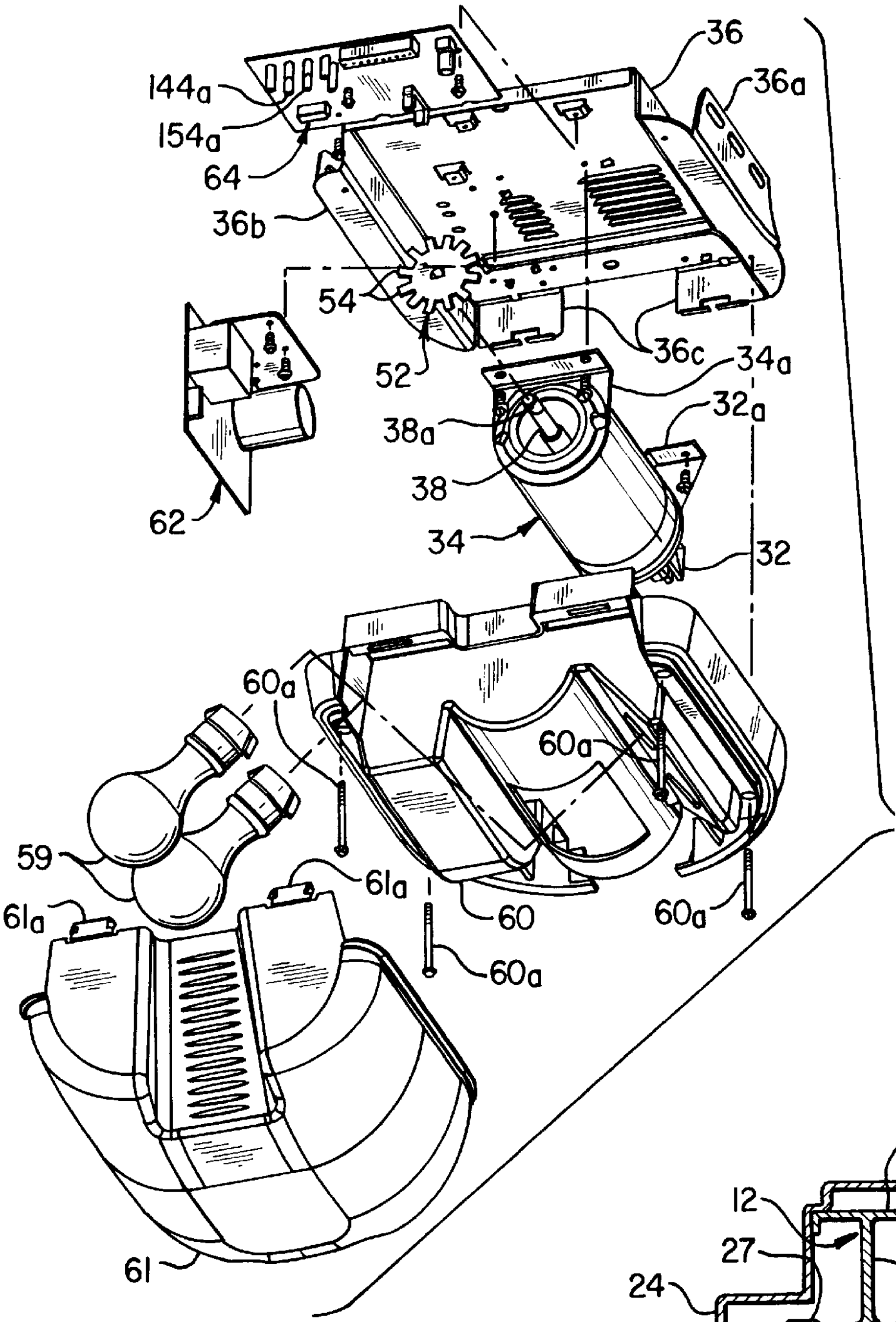
FIG. 1A is an exploded perspective view of certain components of the operator shown in FIG. 1.
Figure 2:
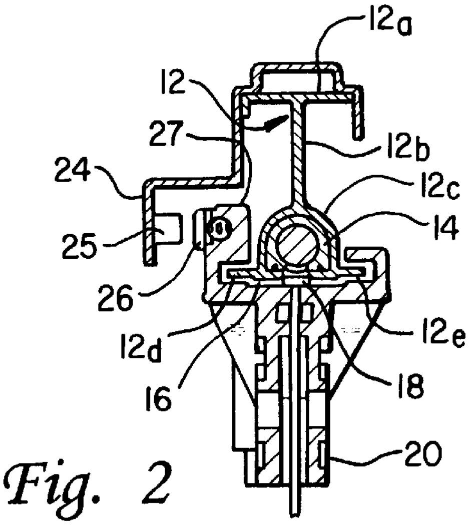
FIG. 2 is a transverse section view taken generally along the line 2—2 of FIG. 1.

Referring to FIGS. 1, 1A and 2, there is illustrated a door operator, generally designated by the numeral 10, for moving an upward acting sectional or one piece garage door between open and closed positions. One piece or so-called California-type doors as well as sectional doors are usually adapted to be guided between open and closed positions on opposed guide rails or tracks. Such doors are well known and a further description of the respective types of doors is not believed to be necessary to practice the present invention. The operator 10 is, in some respects, an exemplary embodiment in that it is characterized by an elongated extruded metal rail member 12 which, as shown in FIG. 2, comprises a transverse upper flange part 12*a*, a depending web 12*b* and an integral, somewhat tubular boss 12*c* with opposed longitudinal laterally projecting flange portions 12*d* and 12*e*. The tubular boss 12*c* is adapted to retain therein an elongated somewhat inverted U-shaped bearing liner member 14 for journalling an elongated power screw 16 therein. The bearing liner 14 is preferably formed of a suitable bearing material such as Montell 1900 engineering elastomer or equivalent with a silicone additive. The power screw 16 is adapted to be connected to a releasable nut or rack member 18 disposed on a carriage member 20 which is supported for sliding movement on the rail 12 by the lateral flanges 12*d* and 12*e*. The carriage 20 is adapted to be connected to a suitable linkage 21, FIG. 1, connected to a door 21*a* in a conventional manner. The nut or rack member 18 is also adapted to be released from operable engagement with the screw 16 when desired, also in a somewhat conventional manner. Accordingly, upon rotation of the screw 16 by a motor to be described in further detail herein, the nut or rack 18 and carriage 20 may traverse together linearly along the rail 12 in opposite directions, also in a manner known to those skilled in the art to move the door 21*a* between open and closed positions.

As shown in FIGS. 1 and 2, the rail 12 supports spaced apart brackets 22 and 24 thereon at substantially opposite ends of the rail, which brackets are adapted to support magnetically actuated reed type switches 23 and 25, respectively, FIG. 1. A permanent magnet 26 is mounted on a suitable boss 27, FIG. 2, on the carriage 20 such that, when the carriage 20 moves into proximity to the switches 23 and 25, respectively, these switches are actuated to effect operation of a controller for the operator 10 to be described in further detail herein. The brackets 22 and 24 may be selectively positioned along the rail 12. However, the bracket 22 is positioned in such a way that when door 21*a*, connected to the carriage 20, is in a closed position the switch 23 is actuated as a down or door closed limit switch to shutoff power to a motor drivingly connected to the screw 16. Conversely, when the carriage 20 moves into proximity of its magnet 26 to the switch 25, this switch is actuated as an up limit or door open limit switch to also effect shutoff of the door operator motor.

Referring further to FIG. 1, the rail 12 is supported at a distal end 12*f* by a suitable wall bracket 13 and the rail 12 is supported at its opposite end 12*g* by a support member 32 for a permanent magnet reversible DC electric drive motor 34. The motor 34 is mounted on the support member 32 and on a support plate 36, FIGS. 1 and 1A, which is adapted to be connected to suitable support structure, not shown, in a conventional manner for upward acting door operators.

The motor 34 includes a rotatable armature shaft 38 rotatably supported in suitable bearings 40 and 42 and directly coupled to the screw 16 by a coupler 44. Directional thrust loads on the screw 16 are taken through a thrust bearing 46 which, together with the coupling 44, is mounted in a suitable bore 33 formed in the support member 32. In FIG. 1, the carriage 20 is shown in a position wherein its movement toward the motor 34 is limited by engagement with a stop member 43, slidably disposed on rail 12 and operable to engage a resilient abutment 48 mounted on the support member 32. Distal end 38*a* of shaft 38 is connected to an optical signal encoder wheel 52 having a plurality of circumferentially spaced teeth 54 formed thereon and positioned adjacent to a photocell type sensor 56 which is operably associated with the wheel 52 to generate a pulse-type low voltage electrical signal which is directly proportional to incremental rotation of the shaft 38 and the screw 16. Accordingly, a signal generated by the encoder or sensor 56 may be correlated with the position of the carriage 20 and door 21*a* and also used to determine motor and door operating speed.

As further shown in FIGS. 1 and 1A, the operator 10 includes a suitable housing or cover 60 for the motor 34 and encoder wheel 52, which cover is also adapted to cooperate with the support plate 36 to house a suitable motor control circuit 62, a main controller unit 64 and a radio receiver 66 operably connected to and mounted on the controller unit 64. The motor control circuit 62, the controller unit 64 and the receiver 66 are adapted to be mounted within the cover 60. A suitable garage light or lamp assembly 59 is mounted on cover 60, FIG. 1A, and covered by a molded translucent lens member 61 which is releasably connected to cover 60 by tabs 61*a*, for example.

Referring further to FIGS. 1 and 1A, the support plate 36 includes opposed longitudinal somewhat channel-shaped flanges 36*a* and 36*b* for securing the operator 10 to suitable support structure depending from a garage ceiling or the like. Spaced apart depending tabs 36*c* of the support plate 36 are operable to be engaged with suitable tabs, not shown, formed on the cover 60 to secure the cover to the support plate. The cover 60 is also releasably secured to the support plate by plural mechanical fasteners 60*a*, as shown. Still further, the motor 34 is secured to the support member 32 by releasable mechanical fasteners, not shown, and the motor 34 is secured to the support plate 36 by fasteners which are operable to engage an angle shaped mounting bracket 34*a* and a flange 32*a*, respectively, on the support member 32. Referring particularly to FIGS. 1 and 1B, the motor support member 32 is advantageously formed as an integral single part casting having a cylindrical hub portion 32*b* including a bearing bore 32*c* for receiving the bearing assembly 40. The integrated support member 32 also includes a longitudinally projecting cantilever beam portion 32*d* which is provided with an elongated longitudinal centrally disposed slot 32*e* formed therein for receiving the web 12*b* of rail 12, see FIG. 1, at the end 12*g* of the rail. Suitable mechanical fasteners 12*h* project through corresponding bores formed in the beam portion 32*d* and the web 12*b* to secure the support member 32 to the rail 12. Accordingly, the support member 32 is advantageously formed as an integral casting and performs several functions as described hereinabove.

Figure 4A:
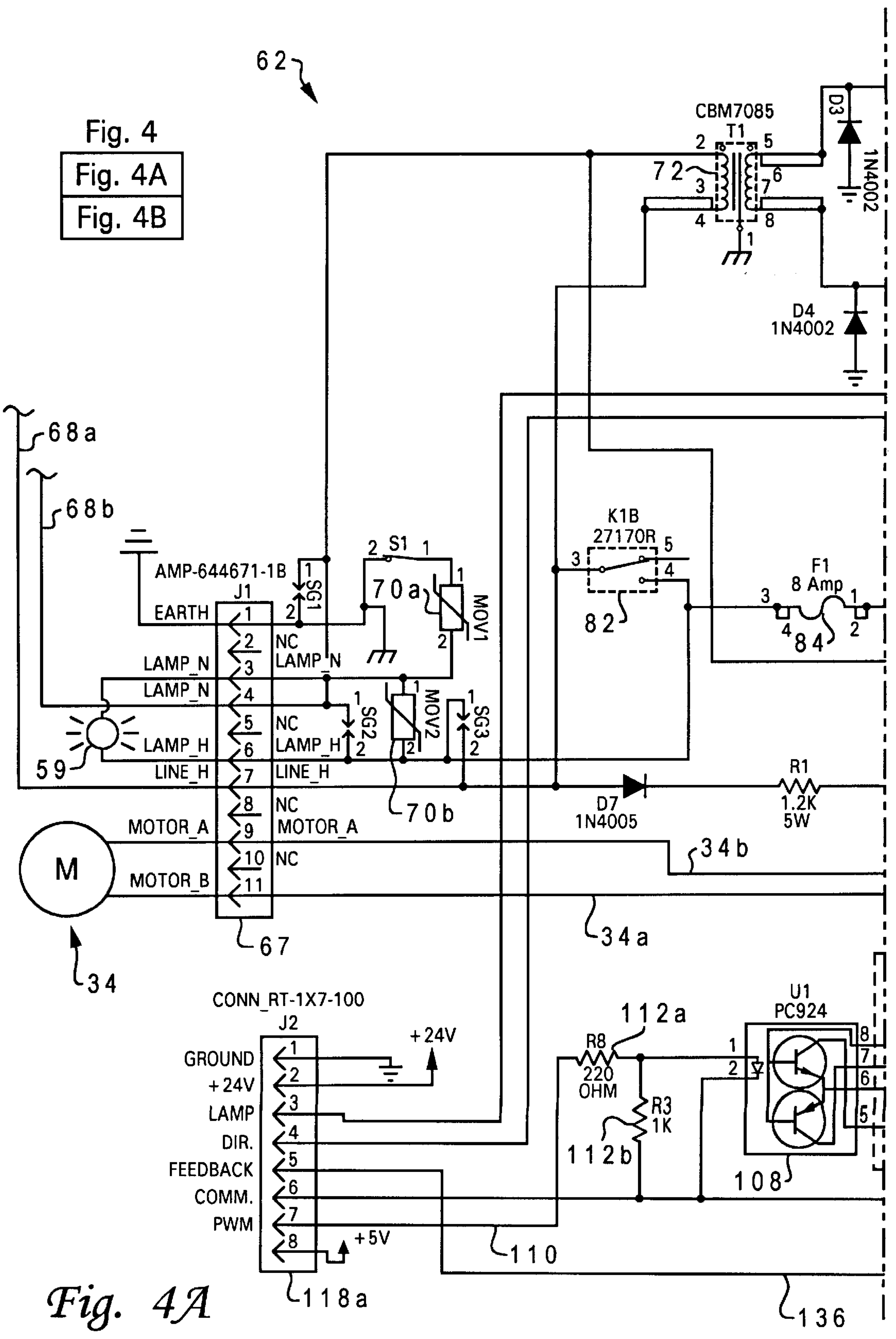
FIG. 4 is a schematic diagram of the motor control circuit for the operator motor.
Figure 4B:
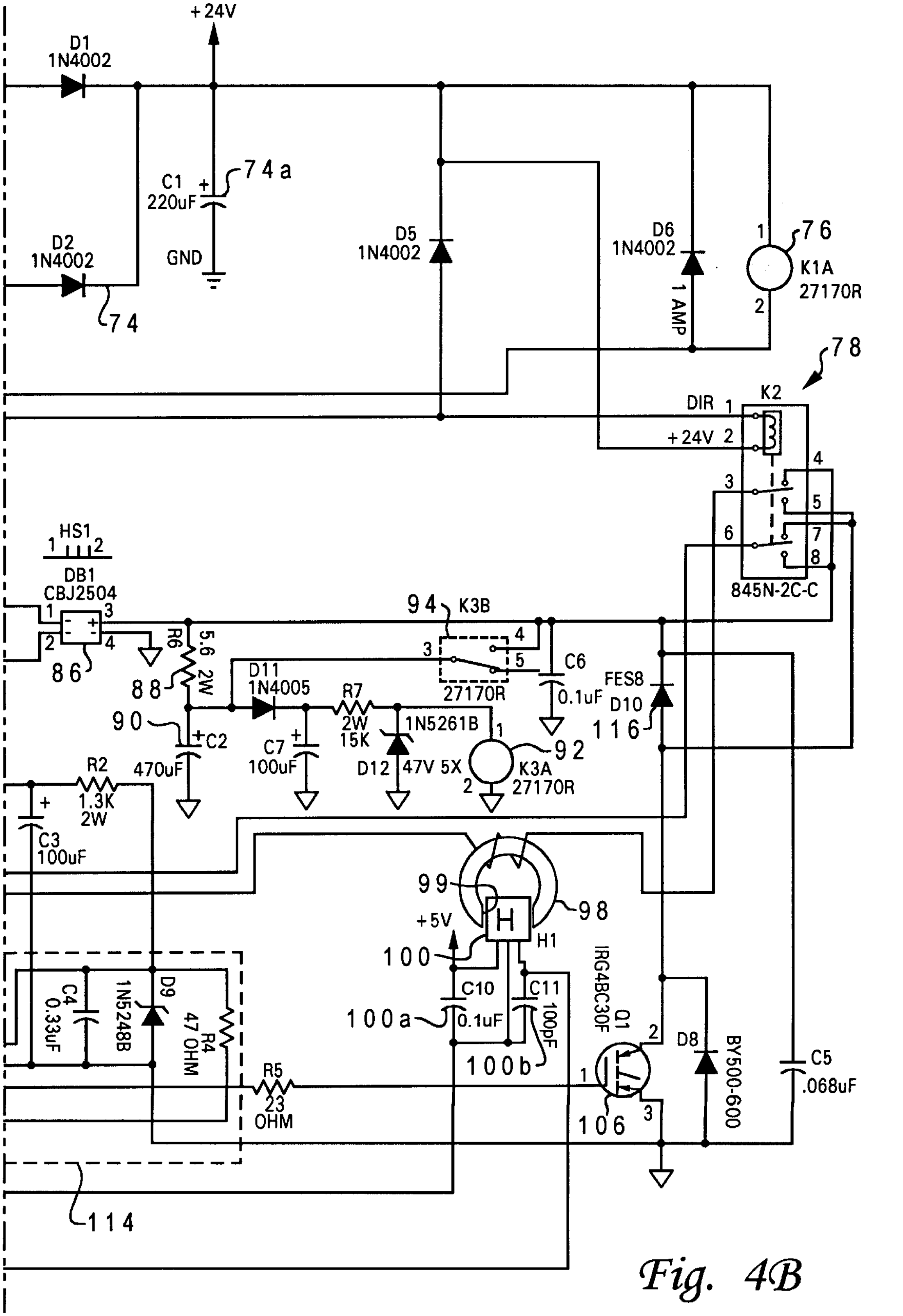

Referring now to FIG. 4, the motor control circuit 62 includes a connector 67 adapted to be connected to a source of alternating current (AC) one hundred ten volt electricity via conductors 68*a* and 68*b*. The input electrical power via the conductors 68*a* and 68*b* is connected via surge protecting varistors 70*a* and 70*b* to a step down transformer 72 which is operable to provide 24 volt AC power to a bridge rectifier 74. Rectifier 74 provides 24 volt DC electric power to the circuit 62 and the controller unit 64 by way of a filter capacitor 74*a*. Twenty-four volt DC power is also supplied to the actuator 76 of a relay 82 for energizing and de-energizing lamp 59 associated with the operator 10. Twenty-four volt DC power is also operable to be supplied to a motor direction reversing relay 78, as shown in FIG. 4.

One hundred ten volt AC line voltage is also supplied to relay 82, a fuse 84 and a motor voltage rectifier 86 to supply DC motor operating voltage to the motor 34 by way of the relay 78. A current limiting resistor 88 prevents current inrush to capacitor 90. Relay coil 92 operates a relay 94 to shunt out the resistor 88 when capacitor 90 is fully charged or energized.

As further shown in FIG. 4, conductors 34*a* and 34*b* extend between the relay 78 and the connector 67 and conductor 34*a* is in circuit with a current sensor comprising a split core transformer 98. Motor current flowing through conductor 34*a* and the split core transformer 98 induces magnetic flux into the core of the transformer, the strength of which is proportional to the magnitude of motor current. A commercially available Hall effect sensor 100 is interposed in a gap 99 of the transformer core and produces an output voltage signal proportional to the strength of the magnetic field or flux across the gap 99. Accordingly, the output signal from the Hall effect sensor 100 is proportional to the current flowing through the motor 34. Filters 100*a* and 100*b* are functional to decouple and stabilize Hall effect sensor 100. The output signal of Hall effect sensor 100 is applied to analog signal inputs of a microcontroller, to be described in further detail herein. This analog signal is converted to a digital signal in the microcontroller where the analog voltage at the microcontroller input pin is converted to a digital signal level between zero and two hundred fifty five, which signal is then applied to an algorithm to determine if the motor is applying a force greater than set by the door operator system, and which is adjustable by the user of the door operator.

The voltage signal imposed on the motor 34 is pulse width modulated by circuitry including an insulated gate bipolar transistor 106 and an insulated gate bipolar transistor driver 108 which receives an input signal from the aforementioned microcontroller via conductor 110 and current limit resistor 112*a* and pulldown resistor 112*b*. The output from driver 108 is regulated by a voltage regulator circuit 114. A back EMF clamp diode 116 is interposed in the motor supply conductors. A connector 118*a* is adapted to be matched with connector 118*b*, FIG. 3B, to provide signals related to motor operation to and from a microcontroller, which, together with associated circuitry, will now be described.

Figures 3, 3A:
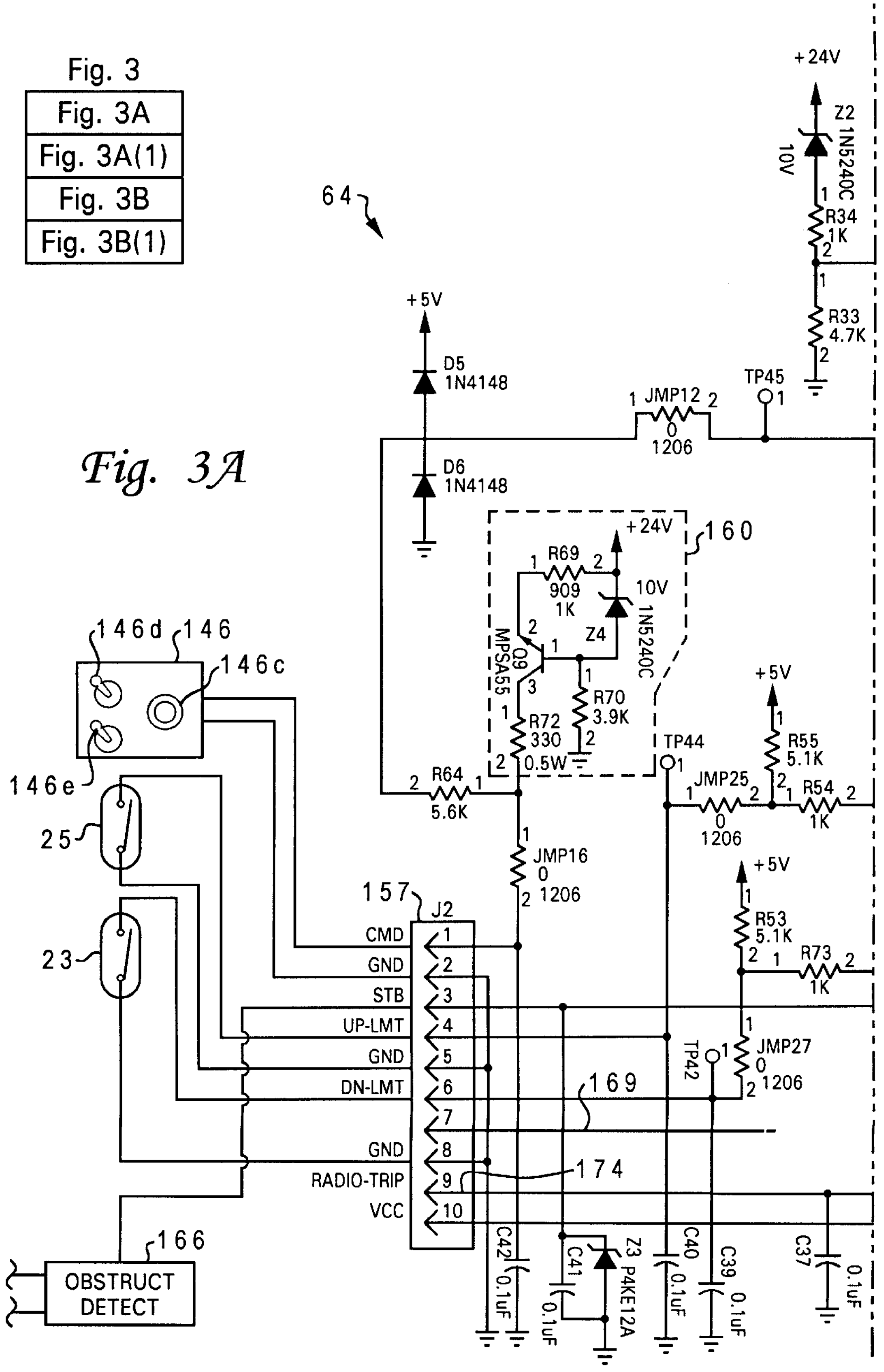
FIGS. 3A and 3B are circuit diagrams of the main controller unit for the door operator control system of the present invention.
Figure 3B:
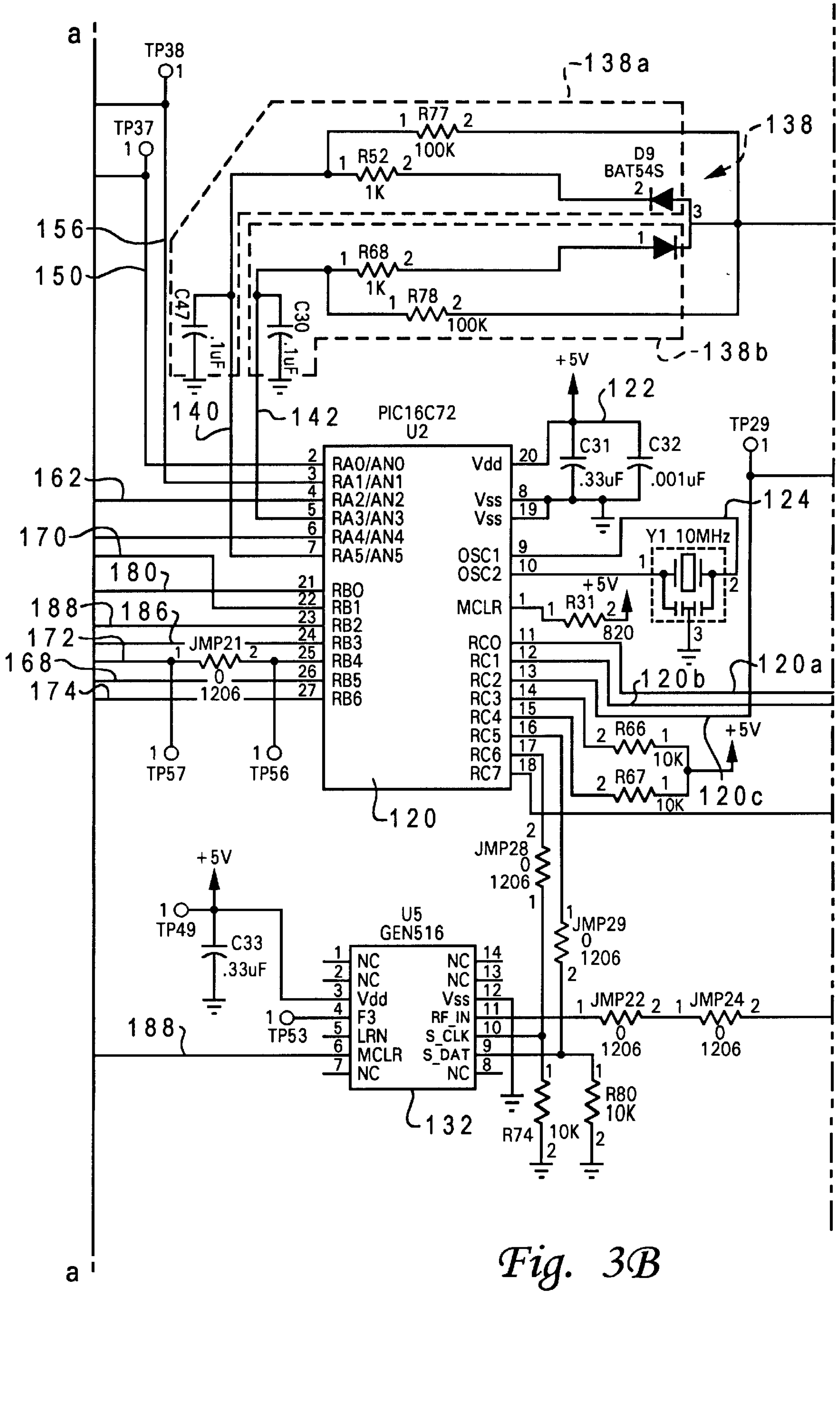

Referring to FIGS. 3A and 3B, these figures are intended to be read together as one circuit diagram by matching the figures along the lines a—a. A key element of the main controller unit 64 is an eight bit programmable microcontroller 120, FIG. 3B, which may be of a type made by Microchip Corporation as their Model PIC16C72. The microcontroller 120 includes internal A/D converter circuits for all analog voltage signals input thereto and is driven by a five volt source, not shown, through a filter circuit 122. Microcontroller 120 is also connected, as shown, to a ten megahertz oscillator 124 operating as a clock for the microcontroller.

Output signals from the microcontroller 120 include an output at conductor 120*a* and current limiting resistors R27 and R29 to provide a switching signal through transistor 124 which provides a suitable relay voltage signal to energize relay actuator 76, FIG. 4, to turn on the operator light or lamp 59 and provide power to rectifier 86, FIG. 4. Motor direction of rotation control signals are imposed by microcontroller 120 on pin RC2 and conductor 120*b*, FIG. 3B, through current limiting resistors R28 and R30 and transistor 130 to control the motor directional control relay 78. An output signal imposed on conductor 120*c* is fed directly through current limiting resistor R32 to the pulse width modulation control circuit conductor 110, FIG. 4, for controlling the driver 108 to vary the voltage pulse width imposed on the motor 34.

The controller unit 64 may be controlled by a radio signal provided from radio receiver 66 which signal is imposed on a decoder circuit 132, FIG. 3B, which is operably connected to the microcontroller 120. The input signal from the radio receiver 66 is imposed on conductor 132*a* into the circuit 132. Input signals to the microcontroller 120 include signals proportional to the current flowing to the motor 34 in both the door opening or upmode and the door closing or downmode and including a signal conducted via conductor 134 from the connectors 118*a* and 118*b* and conductor 136, FIG. 4, providing the signal from the Hall effect sensor 100. As shown in FIG. 3B, this signal is imposed on a filter network 138. The filter network 138 is comprised of two sections, 138*a* and 138*b*. The response of section 138*a* is such that the filter holds the most positive peak voltage from the output of the Hall effect sensor 100, FIG. 4. The output signal of section 138*a* is provided to the microcontroller 120 by conductor 140. The response of section 138*b* is such as to hold the most negative peak voltage from the output of the Hall effect sensor 100, FIG. 4. The output signal of section 138*b* is provided to the microcontroller 120 by conductor 142. Voltage signals proportional to the current flowing through the motor 34 in the door opening operating mode and the door closing operating mode are thus imposed on the controller 120 via the conductors 140 and 142 and these voltage signals vary in relation to the current flowing through the motor which is proportional to motor load. Moreover, the signal output from Hall effect sensor 100 responds to the direction of current flow and the direction of magnetic flux produced in transformer 98. Accordingly, the Hall effect sensor signal output can be used to sense the direction of rotation of motor 34.

The microcontroller 120 is capable of commanding the motor 34 to stop if operating in the door opening mode or to stop and reverse if operating in the door closing mode if the signals to the microcontroller 120 by way of the conductors 140 and 142 exceed preset values. These values may be set by user settable potentiometer type control circuits as shown in FIG. 3A wherein a potentiometer 144 is user settable by a manually operable control knob 144*a*, FIGS. 1 and 1A. Current limiting resistors R39 and R42 are in circuit with the potentiometer 144 and a current limiting resistor R36 is in circuit with the conductor 150, FIGS. 3A and 3B. Accordingly, a variable voltage signal may be imposed on the pin RAO/ANO of microcontroller 120 which will preset the maximum motor current limit the microcontroller senses by way of the proportional voltage signal which is imposed on terminal RA3/AN3 via conductor 142.

The microcontroller 120 is operable, upon sensing a voltage signal via conductor 142 which exceeds that set by the potentiometer 144 to effect stopping the motor 34 and reversing the motor to cause a door connected to the operator 10 to move to an open position. Conversely, a user settable motor load control potentiometer 154 is in circuit with the microcontroller 120 via conductor 156 to pin RAI/ANI. Control knob 154*a*, FIGS. 1 and 1A, is connected to the potentiometer 154 for adjusting the position of same. Current limiting resistors R40 and R41 are in circuit with the potentiometer 154 and a current limiting resistor R35 is interposed in conductor 156 as shown. Accordingly, when the motor 34 is operating a door to move to an open position if the motor current should exceed that preset by the potentiometer 154 the microcontroller 120 will effect motor shutoff by failing to send an enabling signal to the driver 108. Control knobs 144*a* and 154*a* are preferably mounted directly on potentiometers 144 and 154 on controller unit 64 and are user accessible as shown in FIG. 1.

A user operated control unit 146, FIG. 3A, includes a momentary or push button type switch 146*c* which is operable to effect opening or closing movement of a door connected to the operator 10, depending on the condition of the operator and the position of the door. The so-called "command" or control unit 146 is normally mounted on a wall within the enclosure or garage, not shown, with which the operator 10 is associated. Still further, the control unit 146 includes suitable switches 146*d* and 146*e* which are operable, respectively, to "lock out" operation of the operator 10 and to manually operate the light 59 which illuminates the garage area in the vicinity of the operator. Circuit 160, FIG. 3A is a current source for the control unit 146. Analog input signals from the switches of control unit 146 are conducted to pin RA2/AN2 via conductor 162. Current limiting resistors R64 and JMP12 are interposed in the conductor 162 and transient voltage clamping diodes D5 and D6 are connected to conductor 162.

As further shown in FIG. 3A, the controller unit 64 is operable to receive a signal from a doorway obstruction detector 166, typically a pulse type signal, via resistors JMP30, R56 and R57 and transistor Q7 to input pin RB5 of microcontroller 120. A signal indicating whether or not obstruction detector 166 is operable may also be imposed on microcontroller 120 through a circuit including a transistor and associated resistors and diodes, not shown, and connected to pin RB7, if application requirements include such a feature. Door position "up" limit switch 25 is operable to impose a signal on the microcontroller at pin RB1 via conductive path 170. In like manner a signal from the door position down limit switch 23 is imposed on pin RB4 of microcontroller 120 via conductive path 172. Conductive paths 168, 170 and 172 are connected to suitable noise filtering and transient voltage clamp circuitry, as shown in FIG. 3A. Connector 157, through which signals from the control unit 146, the switches 23 and 25 and the obstruction detector 166 are transmitted, also includes a conductor port 174 for an external radio connection to also provide a suitable input signal to the microcontroller 120, if desired.

FIG. 3A also illustrates the circuit components for the photosensor encoder 56 whose pulse type signal is delivered to microcontroller 120 via conductive path 180 at pin RB0 of microcontroller 120. Pin RB3 of microcontroller 120 is connected to an LED 184 via a conductive path 186 for indicating system status during servicing operations. Microcontroller 120 is connected to decoder 132 via a conductive path 188 to reset the decoder for receiving successive signal inputs from the radio receiver 66. The circuit elements not specifically discussed hereinabove but shown on FIGS. 3A and 3B are believed to be readily understandable to those of ordinary skill in the art based on the foregoing description of the circuitry of the controller unit 64 and the motor control circuit 62.

Accordingly, the controller unit 64 and the motor control circuit 62 are operable to control operation of the motor 34 in response to commands from the control unit 146 or commands received from the receiver 66. The microcontroller 120 is adapted to be programmed to operate the motor 34 in the door opening mode at a predetermined speed for a sectional type door, for example, a linear speed of about b 14.0inches per second. However, the speed of movement of the door in the closing mode is preferably somewhat less than the door opening speed, namely about 5.5 inches per second to 7.0 inches per second linear speed. Accordingly the door 21*a* may be opened quickly but is closed at a predetermined lower speed which will minimize any hazards to persons attempting to move through the doorway while the door is in motion toward the closed position.

The microcontroller 120 is also programmed to determine the type of door connected to the operator 10 during initial and any subsequent operation of the motor 34 to move the door from a closed position to an open position. Thanks to the provision of the pulse encoder 56, a pulse type signal related to linear travel of the operator drive mechanism and a door connected thereto is measured during each movement of the door from a closed limit position to an open limit position. If this travel distance, as measured by the encoder pulse count delivered to the microcontroller 120 from the encoder 56, indicates a linear travel of the operator of less than 4.0 feet, for example, the microcontroller automatically acknowledges that the type of door in which the operator is connected is a one piece or so-called California type door. If this shortened linear travel distance is detected, subsequent operations of the operator 10 will drive the door from a closed position to an open position at a reduced speed, preferably 5.5 inches per second to 7.0 inches per second, for example, which is preferable due to the rapid movement of the edge of a one piece door as compared to movement of a sectional type door. Accordingly, the operator 10 automatically adjusts the speed of travel of a door to accommodate the type of door to which the operator is connected.

Still further, the operator 10 may be set up so that the microcontroller 120 automatically shuts off motor 34 in the door opening or closing mode if a predetermined maximum motor load is encountered indicating an obstruction or a door limit position. The pulse width modulated voltage signal delivered to motor 34 may be preset to a maximum pulse width as a function of time for both the operator opening and closing operating modes. These maximum motor voltage pulse widths and motor load values may be, effectively, adjusted in the up and down operating modes by way of the potentiometers 144 and 154, respectively by the door user by adjusting the potentiometers at the control unit 146. The voltage signals imposed on the microcontroller 120 by way of the conductive paths 150 and 156, respectively, correspond to a maximum current value sensed by the current sensor circuit including the transformer 98 and the Hall effect sensor 100 and the associated circuitry connected thereto and described hereinabove. In operation, the microcontroller 120 automatically adjusts the pulse width of the voltage signal imposed on the motor 34 in accordance with the direction of travel and the type of door connected to the operator 10 to maintain the predetermined speeds mentioned above. These predetermined speeds are accomplished through the feedback signal provided by the photosensor encoder 56 and the associated wheel 52 mounted on the motor shaft 38.

Still further, the operating speed of the motor 34 when moving the door between open and closed positions may be controlled to accelerate movement of the door initially up to the limit speed and then, as a consequence of measuring the distance of movement of the door and comparing that distance to the total distance of movement between the limit switches 23 and 25 the microcontroller 120 may control the pulse width modulated signal delivered to the motor 34 to decelerate or slow down movement of the door just prior to actuation of the limit switches 23 or 25. In this way, the door connected to the operator 10 may be accelerated and decelerated smoothly, although actual shut off of current to the motor 34 is subject to actuation of the limit switches 23 or 25. Such operation substantially reduces stress and strain on the operator 10 and a door structure connected thereto.

Microcontroller 120 may also be programmed to effect operation of a door connected to operator 10 in an opening and/or closing mode at a maximum frequency of operating cycles. Still further, the microcontroller may be programmed to "lock out" the maximum motor load setting as set by the potentiometers 144 and 154 for predetermined periods of time during initial start up of the motor from a door open position or a closed position to overcome friction and inertia in the door and operator system and to allow a door to "break free" when moved from a closed position to an open position if, for example, there is an accumulation of ice or debris adjacent to the door which would resist door opening movement.

Figure 5:
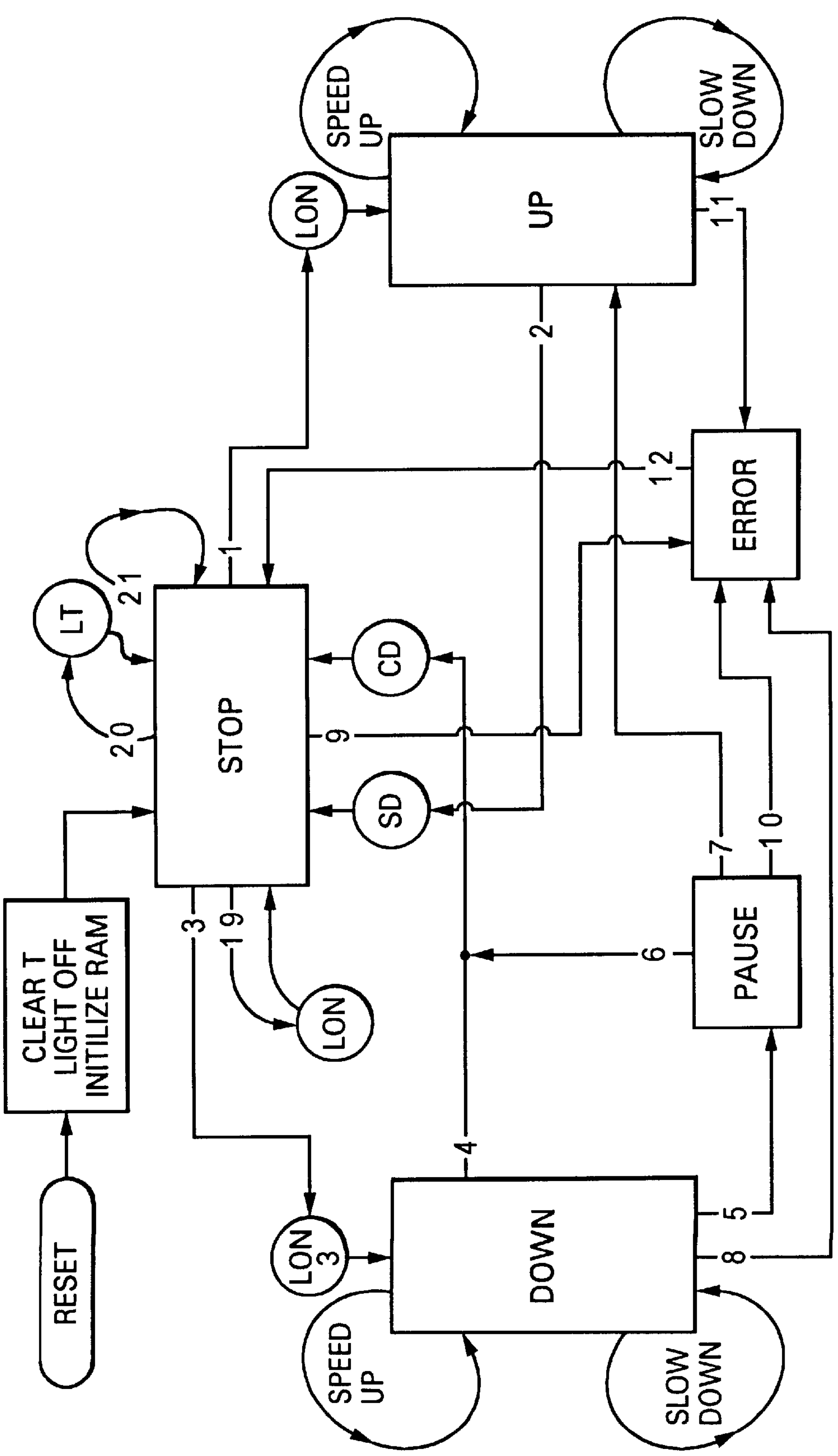
FIG. 5 is a state diagram for the operator control system of the present invention.

Referring now to FIG. 5, there is illustrated a so-called state diagram for the door operator 10 as controlled by the controller unit 64 and the motor control circuit 62. The numbered paths of the diagram of FIG. 5 refer to operating algorithms. After any previous operation of the operator 10, the controller unit 64 is reset automatically by clearing all timing functions, turning off the garage light or lamp 59 and initializing a memory circuit of the microcontroller 120. In this condition, the motor 34 is shut off and the door 21*a* may be in an open, partially opened or closed position.

If a signal is received by microcontroller 120 from receiver 66 or switch 146*c*, or an external radio source by way of conductive path 174, and the door position is such that up limit switch 25 is not closed and the lock switch 146*d* has not been actuated and current is not already flowing to the motor by way of the relays 78 and 82 and the controller 120 has not sensed an operating cycle frequency greater than a preset maximum (algorithm 1), the controller unit 64 will effect energization of the motor 34 to move a door toward the up or open position and lamp 59 will be turned on. The microcontroller 120 will sequence the operation of the circuit 62 by energizing the relay 78 during a period of forty microseconds followed by energization of the lamp 59 during a following period of 40 microseconds and then energizing the relay 92, 94 during a third forty microsecond period. During the first one second of operation of the motor 34 to move the door toward an up or open position, the driver 108 is controlled to accelerate the motor to the preset speed of 14 inches per second or 5.5 inches per second if a California type door has been connected to the operator 10. As the door approaches the switch 25, as detected by the number of counts or pulse signals delivered from the encoder 56 to the microcontroller, during a one second interval prior to engagement of the switch 25, motor 34 is decelerated to slow movement of the door to a speed of approximately three inches per second prior to actuation of switch 25. Actuation of switch 25, of course, stops operation of the motor 34 and resets the controller unit 64.

If the door is moving toward the up or open position and signals are received by the microcontroller 120 from switch 146*c* or receiver 66 or the external radio circuit or the switch 25 or the operating time of the motor is greater than a maximum cycle time (i.e., about 29 seconds) or the motor "torque" limit has been exceeded by a current sensed through the transformer 98 and Hall effect sensor 100, which is greater than the limit set by the potentiometer 154 and this signal is sensed at a time greater than about 0.5 seconds and relays 78, 82 are not in the wrong position (current flowing when relay is open) the motor 34 is shutoff and the controller unit 64 reset (algorithm 2).

Referring further to the diagram of FIG. 5, if the state of the operator 10 is in the stopped condition and the aforementioned pushbutton switch 146*c*, or a signal from radio receiver 66 or an external radio is received and switch 23 is not actuated (indicating the door in a down limit position), and the door is movable down or the switch 25 is actuated and detector 166 does not detect an obstruction and operating cycle frequency has not been exceeded and relays 78, 82 are not in the wrong position, motor 34 will be energized (algorithm 3) to move the door downward at a reduced speed again through the acceleration phase described above and the one second deceleration phase also described above which is initiated just prior to the magnet 26 moving into proximity to the switch 23. Movement toward the down position will continue unless the setting of potentiometer 144 as detected by the microcontroller 120 is exceeded by the current signal received from the sensor comprising the transformer 98 and Hall effect sensor 100 and the system has not exceeded the operating cycle frequency limit. When the down limit switch 23 is actuated the controller unit 64 will return to the stop state. However, if the down limit switch 23 is actuated or a signal is received by the microcontroller 120 from pushbutton switch 146*c*, receiver 66 or an external radio before the down limit switch is actuated, the controller unit 64 will stop operation of the motor 34 and reset the control circuitry for a further signal (algorithm 4). In all algorithms 1 through 11, the motor relays 78 and 82 must be in the proper position for the command given.

If the motor 34 is operating to move the door to the down limit position and has not actuated switch 23 and microcontroller 120 has received a signal from the obstruction detector 166, the pushbutton switch 146*c* or the receiver 66 or an external radio, or operating time has exceeded the maximum cycle time (twenty-nine seconds) or the setting of potentiometer 144 has been exceeded by motor current flow and this setting has not been overridden by the pushbutton switch 146*c* or by a timing signal of 0.5 seconds, the controller will cause the motor 34 to pause (algorithm 5). In the pause condition, if the operator 10 is at the door up limit position and the relays are in proper position, the operator 10 will move the door to the closed position, stop the motor 34 and reset the controller unit 64 (algorithm 6). In the pause condition, if the operator 10 is not at the door up limit position and the operating time is greater than 0.5 seconds from startup, the door will move to the open or up position (algorithm 7).

If the door 21*a* is not moving to the down position and a relay status signal indicates an incorrect motor relay position, an error state will occur and the operator will stop motor 34 (algorithm 8). Algorithms 9, 10 and 11 also create an error status if the motor relays 78 and/or 82 indicate motor current flow or direction not commanded. Controller unit 64 stops current flow to motor 34 at all error status conditions.

As further indicated by the state diagram of FIG. 5 (algorithm 19) if a signal has been received to effect operation of the operator 10, the lamp 59 will be energized to indicate that power is supplied to the operator 10, but the operator is otherwise inoperable. With regard to algorithm 20, unless the switch 146*e* has been actuated to manually turn on lamp 128, the lamp 128 will turn off after a predetermined interval, such as five minutes. Still further, as indicated by algorithm 21, if operating cycle frequency is greater than a predetermined frequency, the system will not operate until a predetermined time interval has elapsed.

The construction and operation of the operator 10, including the motor control circuit 62 and the controller unit 64, as well as a method of controlling operation of a door with the operator 10, is believed to be understandable to those of ordinary skill in the art of door operator systems based on the foregoing description. Conventional engineering materials and components may be used to carry out the invention, all of which are commercially available at the time of filing of the instant application. Although a preferred embodiment of the invention has been described in detail herein, sufficient to enable those skilled in the art to practice the invention, various substitutions and modifications may be made to the invention without departing from the scope and spirit of the appended claims.

What is claimed is:

1. An operator for an upward acting door including:

an electric motor;

a drive mechanism operably connected to said motor and to said door for moving said door between open and closed positions;

a motor control circuit for energizing said motor to cause said drive mechanism to move said door to an open or up limit position and a closed or down limit position;

a microcontroller operably connected to said motor control circuit to effect operation of said motor in opposite directions;

a first switch for causing said microcontroller to effect energization of said motor to move said door in a direction depending on the state of said operator;

a current sensor in said motor control circuit for generating a signal to said microcontroller proportional to current flowing to said motor when said motor is operating in a first direction and a second direction, said current sensor comprising a transformer for generating a magnetic field and a Hall effect sensor for sensing the intensity of said magnetic field as a measure of the current flowing to said motor, said Hall effect sensor being operably connected to said microcontroller to provide signals proportional to current flowing through said motor; and user settable current limiters operably connected to said microcontroller for setting predetermined limits of current flowing through said motor to effect shutoff of said motor when a current limit has been exceeded in at least one of an operating mode of said motor to move said door between open and closed positions.

2. The door operator set forth in claim 1 wherein:

said settable current limiters comprise potentiometers adjustable by a user of said door operator to set the maximum current flow through said motor when said motor is operating to open said door and close said door, respectively.

3. The door operator set forth in claim 1 wherein:

said Hall effect sensor is connected to a circuit for receiving voltage pulse signals from said Hall effect sensor and providing variable voltage analog signals to said microcontroller proportional to the current flowing through said motor when operating in a direction to open said door and close said door, respectively.

4. The door operator set forth in claim 1 wherein:

said motor is a DC variable speed motor and said microcontroller is operable to provide a pulse width modulated voltage signal to said motor to control the operating speed of said motor.

5. The door operator set forth in claim 4 wherein:

said motor control circuit includes an insulated gate bipolar transistor and an isolated gate bipolar transistor driver operably connected to said microcontroller for receiving a signal to generate said pulse width modulated voltage signal to said motor.

6. The door operator set forth in claim 4 including:

a motor speed sensor for detecting the operating speed of said motor and operable to provide a pulse type signal to said microcontroller, said microcontroller being operable to vary the pulse width modulated signal to said motor to maintain a predetermined speed during at least a portion of an operating cycle to move said door between open and closed positions.

7. The door operator set forth in claim 6 wherein:

said motor speed sensor comprises a toothed wheel mounted on an output shaft of said motor and a photocell sensor device mounted adjacent said toothed wheel for generating a pulse type electrical signal to said microcontroller.

8. The door operator set forth in claim 6 including:

limit switches for indicating an open limit position of said door operator and a closed limit position of said door operator, respectively, said limit switches being operably connected to said microcontroller for providing signals to said microcontroller, respectively, said microcontroller being operable in response to a signal to energize said motor to move a door between an open and closed position to selectively control the speed of said motor and said door depending on the direction of movement of said door.

9. The door operator set forth in claim 8 wherein:

said microcontroller is responsive to one of a signal from a door position limit switch and the state of the operator as a consequence of a previous operation to cause said motor to operate at a first speed when energized to move said door toward an open position and to cause said motor to operate at a second speed less than said first speed when moving said door toward a closed position.

10. The door operator set forth in claim 9 wherein:

said microcontroller is operable to cause said motor control circuit to move said door toward an open position at a speed at least twice as fast as the speed of movement of said door toward a closed position.

11. The door operator set forth in claim 6 wherein:

said speed sensor is operable to provide a signal to said microcontroller proportional to the total travel distance of said drive mechanism when moving said door from a closed position to an open position.

12. The door operator set forth in claim 11 wherein:

said microcontroller is operable to adjust a signal to said motor control circuit to control the speed of said motor and said drive mechanism depending on the travel distance of said drive mechanism when moving said door from said closed position to said open position.

13. The door operator set forth in claim 1 wherein:

said drive mechanism includes a magnet mounted on a member of said drive mechanism connected to said door, and said operator includes spaced apart limit switches mounted in proximity to said drive mechanism and responsive to said magnet moving into proximity to said limit switches to effect actuation of said limit switches, respectively, to cause said microcontroller to shut off power to said motor.

14. An operator for an upward acting door including:

an electric motor;

a drive mechanism operably connected to said motor and to said door for moving said door between open and closed positions;

a motor control circuit for energizing said motor to cause said drive mechanism to move said door to an open or up limit position and a closed or down limit position;

a microcontroller operably connected to said motor control circuit to effect operation of said motor in opposite directions;

a user actuatable switch for causing said microcontroller to effect energization of said motor to move said door in a direction depending on the state of said operator; and limit switches for indicating an open limit position of said operator and a closed limit position of said operator, respectively, said limit switches being operably connected to said microcontroller for providing signals to said microcontroller, respectively, said microcontroller being operable in response to a signal to energize said motor to move said door between an open and closed position to selectively control the speed of said motor and said door depending on the direction of movement of said door, and said microcontroller being responsive to one of a signal from a limit switch and the state of said operator as a consequence of a previous operation to cause said motor to operate at a first speed when energized to move said door toward an open position and to cause said motor to operate at a second speed less than said first speed when moving said door toward a closed position.

15. The door operator set forth in claim 14 wherein:

said microcontroller is operable to cause said motor control circuit to move said door toward an open position at a speed at least about twice as fast as the speed of movement of said door toward a closed position.

16. An operator for an upward acting door including:

an electric motor;

a drive mechanism operably connected to said motor and to said door for moving said door between open and closed positions;

said drive mechanism including a magnet mounted on a member of said drive mechanism connected to said door, a motor control circuit for energizing said motor to cause said drive mechanism to move said door to an open or up limit position and a closed or down limit position;

a microcontroller operably connected to said motor control circuit to effect operation of said motor in opposite directions;

a user actuatable switch for causing said microcontroller to effect energization of said motor to move said door in a direction depending on the state of said operator; and limit switches for indicating an open limit position of said operator and a closed limit position of said operator, respectively, said limit switches being operably connected to said microcontroller for providing signals to said microcontroller, respectively, said microcontroller being operable in response to a signal to energize said motor to move said door between an open and closed position to selectively control the speed of said motor and said door depending on the direction of movement of said door, and said limit switches are mounted in proximity to said drive mechanism and responsive to said magnet moving into proximity to said limit switches to effect actuation of said limit switches, respectively, to cause said microcontroller to shut off power to said motor.

17. An operator for an upward acting door including:

an electric motor;

a drive mechanism operably connected to said motor and to said door for moving said door between open and closed positions;

said drive mechanism includes a magnet mounted on a member of said drive mechanism connected to said door;

a motor control circuit for energizing said motor to cause said drive mechanism to move said door to an open or up limit position and a closed or down limit position;

a microcontroller operably connected to said motor control circuit to effect operation of said motor in opposite directions;

a user actuatable switch for causing said microcontroller to effect energization of said motor to move said door in a direction depending on the state of said operator;

spaced apart limit switches mounted in proximity to said drive mechanism for indicating an open limit position of said operator and a closed limit position of said operator, respectively, said limit switches being operably connected to said microcontroller for providing signals to said microcontroller, respectively, and responsive to said magnet moving into proximity to said limit switches to effect actuation of said limit switches, respectively, to cause said microcontroller to shut off power to said motor;

a sensor operable to provide a signal to said microcontroller proportional to the total travel distance of said drive mechanism when moving said door from a closed position to an open position; and said microcontroller is operable to adjust a signal to said motor control circuit to control the speed of said motor and said drive mechanism depending on the travel distance of said drive mechanism when moving said door from said closed position to said open position.

18. The door operator set forth in claim 17 including:

a current sensor in said motor control circuit for generating a signal to said microcontroller proportional to current flowing to said motor when said motor is operating in a first direction and a second direction, and user settable current limiters operably connected to said microcontroller for setting predetermined limits of current flowing through said motor to effect shutoff of said motor when a current limit has been exceeded in at least one of an operating mode of said motor to move said door between open and closed positions.

19. The door operator set forth in claim 18 wherein:

said current sensor comprises a transformer for generating a magnetic field and a Hall effect sensor for sensing the intensity of said magnetic field as a measure of the current flowing to said motor, said Hall effect sensor being operably connected to said microcontroller to provide signals proportional to current flowing through said motor.

20. A method for controlling a door operator for moving an upward acting door between open and closed positions, said operator including a reversible electric motor, a drive mechanism connected to said motor and to said door, a control circuit operably connected to said motor for energizing said motor to move said drive mechanism in opposite directions to effect opening and closing of said door, a controller associated with said control circuit for effecting operation of said motor, door position limit switches indicating an open limit position of said door and a closed limit position of said door, a sensor operably connected to said controller for determining the travel distance of said door between open and closed positions, and a user actuatable switch for effecting operation of said controller to energize said motor, said method comprising the steps of:

causing said controller to energize said motor to move said door from a closed position to an open position;

measuring the travel distance of said door to said open position with said travel distance sensor; and causing said controller to energize said motor at a predetermined speed during subsequent operating cycles of said operator dependent on the travel distance of said operator and said door when moving from said closed position to said open position.

21. The method set forth in claim 20 including the steps of:

causing said controller to energize said motor to move said door to an open position at a speed greater than the speed of operation of said motor to move said door to a closed position.

22. The method set forth in claim 20 including the step of:

determining the travel distance of movement of said door between open and closed positions; and causing said controller to reduce the speed of said motor as said door approaches one of said position limit switches and dependent on the position of said drive mechanism with respect to said one limit switch.

23. An operator for an upward acting door including:

a DC variable speed electric motor;

a drive mechanism operably connected to said motor and to said door for moving said door between open and closed positions;

a motor control circuit for energizing said motor to cause said drive mechanism to move said door to an open or up limit position and a closed or down limit position;

a microcontroller operably connected to said motor control circuit to effect operation of said motor in opposite directions and to provide a pulse width modulated voltage signal to said motor to control the operating speed of said motor;

a user actuatable switch for causing said microcontroller to effect energization of said motor to move said door in a direction depending on the state of said operator;

limit switches for indicating an open limit position of said operator and a closed limit position of said operator, respectively, said limit switches being operably connected to said microcontroller for providing signals to said microcontroller, respectively;

a sensor operable to provide a signal to said microcontroller proportional to the total travel distance of said drive mechanism when moving said door from a closed position to an open position; and said microcontroller is operable to adjust a signal to said motor control circuit to control the speed of said motor and said drive mechanism depending on the travel distance of said drive mechanism when moving said door from said closed position to said open position.

24. A method for controlling a door operator for moving an upward acting door between open and closed positions, said operator including a reversible electric motor, a drive mechanism connected to said motor and to said door, a control circuit operably connected to said motor for energizing said motor to move said drive mechanism in opposite directions to effect opening and closing of said door, a controller associated with said control circuit for effecting operation of said motor, door position limit switches indicating an open limit position of said door and a closed limit position of said door, an obstruction detector associated with said door and operable to provide an obstruction detection signal to said controller, a user actuatable switch for effecting operation of said control circuit to energize said motor, a motor current sensor operably connected to said controller for sensing current flowing through said motor and current limit setting means associated with said controller for limiting motor current in operation of said motor to open and close said door, respectively, said method comprising the steps of:

energizing said motor to move said door between open and closed positions and de-energizing said motor when motor current exceeds a preset limit; and causing said controller to energize said motor to move said door toward said open position if said motor has not been energized more than a predetermined number of times in a predetermined time period.

25. A method for controlling a door operator system for moving an upward acting door between open and closed positions, said operator including a reversible electric motor, a drive mechanism connected to said motor and to said door, a control circuit operably connected to said motor for energizing said motor to move said drive mechanism in opposite directions to effect opening and closing of said door, a controller associated with said control circuit for effecting operation of said motor, door position limit switches indicating an open limit position of said door and a closed limit position of said door, an obstruction detector associated with said door and operable to provide an obstruction detection signal to said controller, a user actuatable switch for effecting operation of said control circuit to energize said motor, a motor current sensor operably connected to said controller for sensing current flowing through said motor and current limit setting means associated with said controller for limiting motor current in operation of said motor to open and close said door, respectively, said method comprising the steps of:

energizing said motor to move said door between open and closed positions and de-energizing said motor when motor current exceeds a preset limit; and causing said motor upon being energized to accelerate to a predetermined maximum speed and causing said motor to decelerate to a minimum speed on approaching one of said limit switches.

26. A method for controlling a door operator system for moving an upward acting door between open and closed positions, said operator including a reversible electric motor, a drive mechanism connected to said motor and to said door, a control circuit operably connected to said motor for energizing said motor to move said drive mechanism in opposite directions to effect opening and closing of said door, a controller associated with said control circuit for effecting operation of said motor, door position limit switches indicating an open limit position of said door and a closed limit position of said door, an obstruction detector associated with said door and operable to provide an obstruction detection signal to said controller, a user actuatable switch for effecting operation of said control circuit to energize said motor, a motor current sensor operably connected to said controller for sensing current flowing through said motor and current limit setting means associated with said controller for limiting motor current in operation of said motor to open and close said door, respectively, said method comprising the steps of:

energizing said motor to move said door between open and closed positions and de-energizing said motor when motor current exceeds a preset limit; and energizing said motor to move said door to an open position at a speed greater than the speed of operation of said motor to move said door to a closed position.

27. A door operator for moving an upward acting door between open and closed positions including:

an elongated rail for supporting a carriage for slidable movement along said rail, said carriage including means for connecting said carriage to an upward acting door;

a rotatable screw supported on said rail;

a support plate for said operator;

a reversible electric drive motor for rotatably driving said screw including a bracket for supporting said motor on said support plate;

a support member connected to said motor at one end of said motor, said support member including a part adapted to be connected to said support plate for supporting said motor on said support plate, said support member including a beam portion projecting toward said rail for supporting one end of said rail, a first bore in said support member for receiving a bearing assembly for a shaft of said motor and a second bore in said support member for receiving a coupling for connecting said motor to said screw; and a cover member for covering at least a portion of said motor and releasably connectable to said support plate.

28. A door operator for moving an upward acting door between open and closed positions including:

an elongated rail for supporting a carriage for slidable movement along said rail, said carriage including means for connecting said carriage to an upward acting door;

a rotatable screw supported on said rail;

a support plate for said operator;

a reversible electric drive motor for rotatably driving said screw including a bracket for supporting said motor on said support plate;

a support member connected to said motor at one end of said motor, said support member including a part adapted to be connected to said support plate for supporting said motor on said support plate, said support member including a beam portion projecting toward said rail for supporting one end of said rail;

a resilient bumper member mounted on said support member and engageable with a stop member disposed on said rail; and a cover member for covering at least a portion of said motor and releasably connectable to said support plate.

29. A door operator for moving an upward acting door between open and closed positions including:

an elongated rail for supporting a carriage for slidable movement along said rail, said carriage including means for connecting said carriage to an upward acting door;

a rotatable screw supported on said rail;

a support plate for said operator;

a reversible electric drive motor for rotatably driving said screw including a bracket for supporting said motor on said support plate;

a support member connected to said motor at one end of said motor, said support member including a part adapted to be connected to said support plate for supporting said motor on said support plate, said support member including a beam portion projecting toward said rail for supporting one end of said rail;

a cover member for covering at least a portion of said motor and releasably connectable to said support plate;

a lamp assembly supported on said cover; and a translucent lens member releasably connectable to said cover for covering a substantial portion of said cover and said lamp assembly.

30. An operator for an upward acting door including:

an electric motor;

a drive mechanism operably connected to said motor and to said door for moving said door between open and closed positions;

a motor control circuit for energizing said motor to cause said drive mechanism to move said door to an open or up limit position and a closed or down limit position;

a microcontroller operably connected to said motor control circuit to effect operation of said motor in opposite directions;

a first switch for causing said microcontroller to effect energization of said motor to move said door in a direction depending on the state of said operator;

a current sensor in said motor control circuit for generating a signal to said microcontroller proportional to current flowing to said motor when said motor is operating in a first direction and a second direction; and user settable current limiters comprising potentiometers operably connected to said microcontroller and operable by a user of said operator, at will, for adjusting limit values of current flowing through said motor to effect shutoff of said motor when a current limit set by said user has been exceeded in at least one of an operating mode of said motor to move said door from an open position to a closed position and from a closed position to an open position.

31. An operator for an upward acting door including:

an electric motor;

a drive mechanism operably connected to said motor and to said door for moving said door between open and closed positions;

a motor control circuit for energizing said motor to cause said drive mechanism to move said door to an open or up limit position and a closed or down limit position;

a microcontroller operably connected to said motor control circuit to effect operation of said motor in opposite directions;

a user actuatable switch for causing said microcontroller to effect energization of said motor to move said door in a direction depending on the state of said operator;

limit switches for indicating an open limit position of said door operator and a closed limit position of said door operator, respectively, said limit switches being operably connected to said microcontroller for providing signals to said microcontroller, respectively, said microcontroller being operable in response to a signal to energize said motor to move said door between an open and closed position to selectively control the speed of said motor and said door depending on the direction of movement of said door;

a sensor operable to provide a signal to said microcontroller proportional to the total travel distance of said drive mechanism when moving said door from a closed position to an open position; and said microcontroller being operable in response to said sensor detecting a reduced travel distance when moving said door to an open position to cause said motor control circuit to reduce the speed of said motor when operating said motor in both a door opening mode and a door closing mode.

* * * * *